United States Patent
Yasuda et al.

(10) Patent No.: US 9,759,310 B2
(45) Date of Patent: Sep. 12, 2017

(54) TRANSAXLE

(71) Applicant: KANZAKI KOKYUKOKI MFG. CO., LTD., Amagasaki-shi (JP)

(72) Inventors: Toshifumi Yasuda, Amagasaki (JP); Daisuke Murashima, Amagasaki (JP); Koji Iwaki, Amagasaki (JP); Hiroki Maehara, Amagasaki (JP); Koga Yamane, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 201 days.

(21) Appl. No.: 14/683,864

(22) Filed: Apr. 10, 2015

(65) Prior Publication Data
US 2016/0298743 A1  Oct. 13, 2016

(51) Int. Cl.
| F16D 31/00 | (2006.01) |
| F16H 47/00 | (2006.01) |
| F16H 57/04 | (2010.01) |
| B60K 17/10 | (2006.01) |
| F16H 57/02 | (2012.01) |

(52) U.S. Cl.
CPC ....... F16H 57/0457 (2013.01); B60K 17/105 (2013.01); F16H 57/02 (2013.01)

(58) Field of Classification Search
CPC ........ B60K 17/10; B60K 17/105; F16H 47/02
USPC .................... 74/730.1; 180/291; 60/464, 487
See application file for complete search history.

(56) References Cited

U.S. PATENT DOCUMENTS

| 6,619,038 | B2* | 9/2003 | Takada ................. B60K 17/105 60/444 |
| 7,337,611 | B2* | 3/2008 | Sakikawa .............. B60K 17/10 180/291 |
| 7,621,353 | B2* | 11/2009 | Ishii ....................... B60K 17/28 180/305 |
| 7,971,435 | B2* | 7/2011 | Sumomozawa ........ F16D 31/02 60/464 |
| 8,250,862 | B1* | 8/2012 | Iida ......................... B60T 1/062 180/308 |
| 8,806,864 | B2* | 8/2014 | Ishii ....................... F16H 47/02 60/487 |
| 2015/0007555 | A1 | 1/2015 | Saldierna et al. |

* cited by examiner

*Primary Examiner* — Ha D Ho
(74) *Attorney, Agent, or Firm* — Sterne, Kessler, Goldstein & Fox P.L.L.C.

(57) ABSTRACT

A transaxle comprises a hydrostatic transmission (HST), an axle, a gear train interposed between the HST and the axle, a casing and a partition. The casing defines an HST chamber and a gear chamber. The HST is disposed in the HST chamber. The gear train and the axle are disposed in the gear chamber. The partition is disposed in the casing so as to separate the HST chamber and the gear chamber from each other. The partition has an opening through which a hydraulic motor of the HST passes to extend from the HST chamber into the gear chamber so as to be drivingly connected to the gear train. The partition obstructs a flow of fluid between a fluid sump in the HST chamber from a fluid sump in the gear chamber.

4 Claims, 7 Drawing Sheets

TRANSAXLE

BACKGROUND OF THE INVENTION

Field of the Invention

The invention relates to a transaxle including a hydrostatic transmission (hereinafter "HST").

Related Art

Conventionally, as disclosed in U.S. 2015/0007555 A1, there is a well-known transaxle including a casing that carries an axle and that incorporates an HST and a gear train interposed between the HST and the axle. The HST includes a center section settled on a bottom of the casing via a fluid filter, a vertical axial hydraulic pump mounted on the center section, and a vertically slant axial hydraulic motor mounted on the center section.

A cavity of the casing has front and rear portions. One of the front and rear portions of the cavity serves as an HST chamber accommodating the HST, and the other of the front and rear portions of the cavity serves as a gear chamber accommodating the gear train and the axle. The hydraulic motor having a vertically and fore-and-aft slant axis is extended from the HST chamber into the gear chamber so as to be drivingly connected to the gear train in the gear chamber.

The fluid filter of the HST is submerged in a fluid sump in the cavity of the casing so as to charge the closed fluid circuit of the HST with fluid from the fluid sump. However, the HST chamber and the gear chamber are not partitioned from each other. In this state, a bottom portion of the gear train is also submerged in the fluid sump so that rotating gears agitate the fluid sump so as to tend to contaminate the fluid sump with air, thereby wrongly influencing activation of the HST and causing noise.

SUMMARY OF THE INVENTION

An object of the invention is to provide a transaxle including an HST, configured so as to protect the HST from fluid contaminated with air caused by a gear train disposed together with the HST in a casing.

To achieve the object, a transaxle according to the invention comprises an HST, an axle, a gear train, a casing and a partition. The HST includes a hydraulic pump, a hydraulic motor, and a center section. The hydraulic pump and the hydraulic motor are mounted on the center section so as to be fluidly connected to each other via a closed fluid circuit formed in the center section. The gear train is interposed between the HST and the axle so as to transmit power from the HST to the axle. The casing defines an HST chamber and a gear chamber. The HST is disposed in the HST chamber. The gear train and the axle are disposed in the gear chamber. The partition is disposed in the casing so as to separate the HST chamber and the gear chamber from each other. The partition has an opening through which a power transmission means for transmitting power from the HST to the gear train passes to extend from the HST chamber into the gear chamber so as to be drivingly connected to the gear train.

Therefore, the partition isolates the HST chamber from the gear chamber, while the HST chamber is connected to the gear chamber via the opening so that the power transmission means extended through the opening keeps the power transmission from the HST in the HST chamber to the gear train in the gear chamber.

Preferably, a fluid sump is provided in the HST chamber so that the HST is submerged in the fluid sump in the HST chamber. Another fluid sump is provided in the gear chamber so that the gear train is submerged in the fluid sump in the gear chamber. The partition is configured to obstruct a flow of fluid between the fluid sumps in the HST chamber and the gear chamber.

Therefore, even if the gear train agitates or splashes fluid of the fluid sump in the gear chamber so as to contaminate the fluid with air, the partition hinders the fluid contaminated with air from entering the fluid sump in the HST chamber, thereby reducing air mixed in the fluid sump in the HST chamber so as to keep a proper activation of the HST and so as to reduce noise.

Preferably, the hydraulic motor is extended from the HST chamber into the gear chamber via the opening of the partition so as to serve as the power transmission means.

Therefore, no additional component is needed to serve as the power transmission means, thereby reducing the number of components and costs.

Further preferably, the hydraulic motor is extended vertically slantwise in side view from the HST chamber to the gear chamber, and the partition is extended vertically.

Therefore, a portion of the casing incorporating the hydraulic motor is minimized vertically, and a horizontal distance between the HST and the gear train is reduced so as to minimize the casing in the direction of alignment of the HST chamber and the gear chamber. Further, the vertically extended partition surely separates the HST chamber and the gear chamber from each other, while allowing the vertically slant extended hydraulic motor to pass through the opening in the partition.

Preferably, the casing includes divisional housings formed on the insides thereof with respective ribs serving as the partition. Edges of the respective ribs of the divisional housings facing each other are formed with respective recesses. The divisional housings are joined to each other to constitute the casing so that the ribs of the respective divisional housings abut at the edges thereof against each other, and so that the recesses are joined to each other to serve as the opening.

Therefore, in the condition that the casing includes the divisional housings for facility in assembling and maintenance, the ribs formed on the divisional housings are used to constitute the partition, so that no additional component is needed to serve as the partition, thereby reducing the number of components and costs. Only if the divisional housings are joined to each other to complete the casing, the partition with the opening is completed, thereby facilitating assembling of the partition having the opening in the casing.

These and other objects, features and advantages of the invention will appear more fully from the following detailed description of the invention with reference to attached drawings.

BRIEF DESCRIPTION OF THE DRAWINGS

FIG. 5 is a perspective sectional view of a portion of a transaxle casing 10 defining an HST chamber 10a.

DETAILED DESCRIPTION OF THE INVENTION

Figure 1:
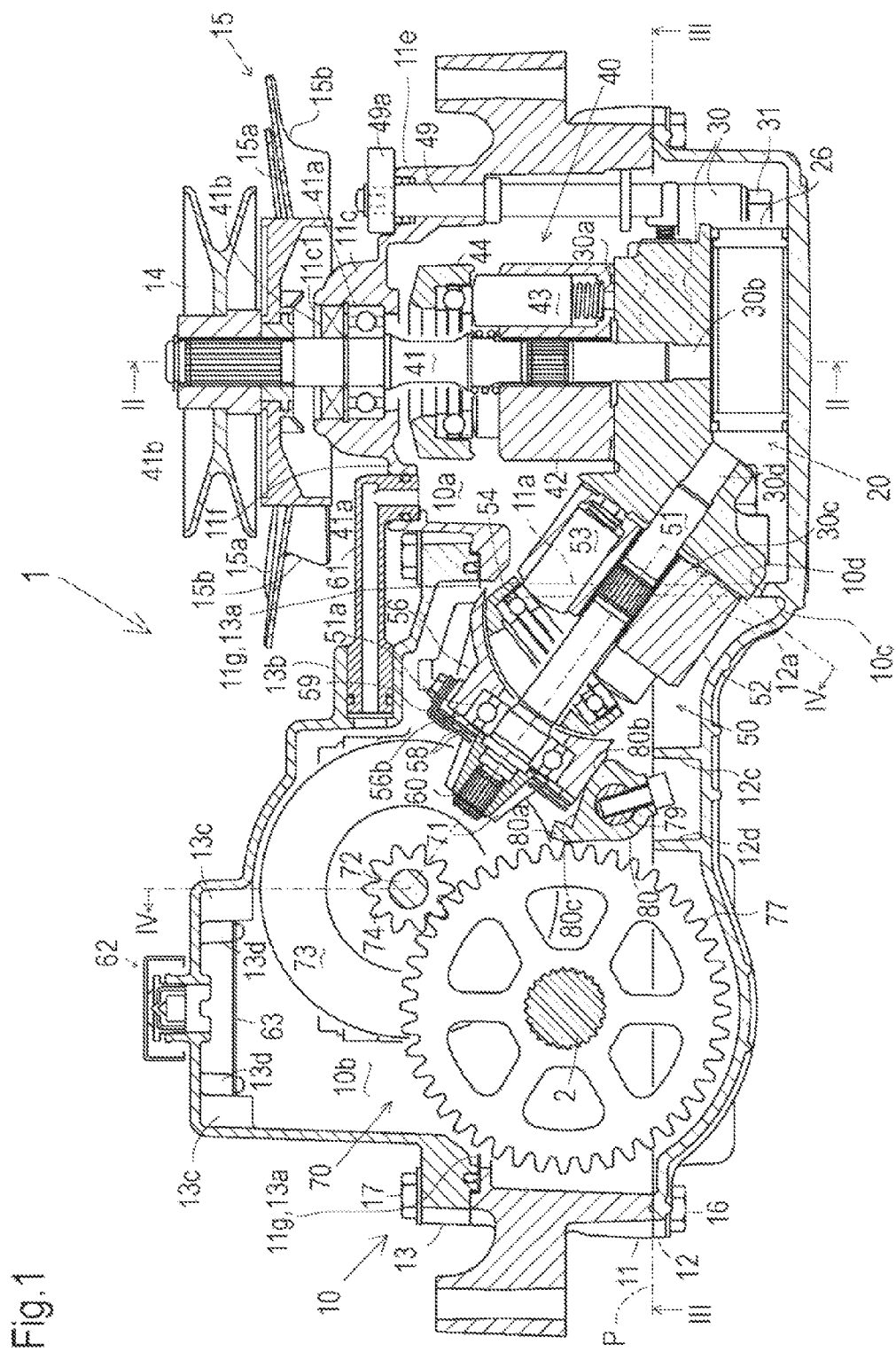
FIG. 1 is a sectional side view of a transaxle 1.

Referring to FIGS. 1 to 6, a transaxle 1 carrying an axle 2 will be described. Transaxle 1 includes a transaxle casing 10, an HST 20 disposed in a front portion of transaxle casing 10, an axle 2 (serving as either a right or left axle of a vehicle) journalled by a rear portion of transaxle casing 10, and a reduction gear train 70 disposed in the rear portion of transaxle casing 10 so as to drivingly connect HST 20 to axle 2. Alternatively, transaxle 1 may be located to have HST 20 in the rear portion thereof and to have reduction gear train 70 and axle 2 in the front portion thereof. However, the following description will be given on the assumption that HST 20 is in the front portion, and reduction gear train 70 and axle 2 in the rear portion.

Transaxle casing 10 includes a main housing 11, a bottom housing 12, and a top housing 13. Main housing 11 and bottom housing 12 abut against each other at a horizontal joint plane P and are fastened together by bolts 16. Main housing 11 is formed at a fore-and-aft middle inside portion thereof with a rib 11a as a plate extended vertically and laterally and joined to right, left and upper side walls of main housing 11. Rib 11a is formed with a downwardly open semicircular recess 11b shaped as an upper half part of a circular hole. Bottom housing 12 is formed at a fore-and-aft middle inside portion thereof with a rib 12a shaped as a vertical and lateral extended plate joined to right, left and bottom side walls of bottom housing 12. Rib 12a is formed with an upwardly open semicircular recess 12b shaped as a lower half part of a circular hole.

Figure 4:
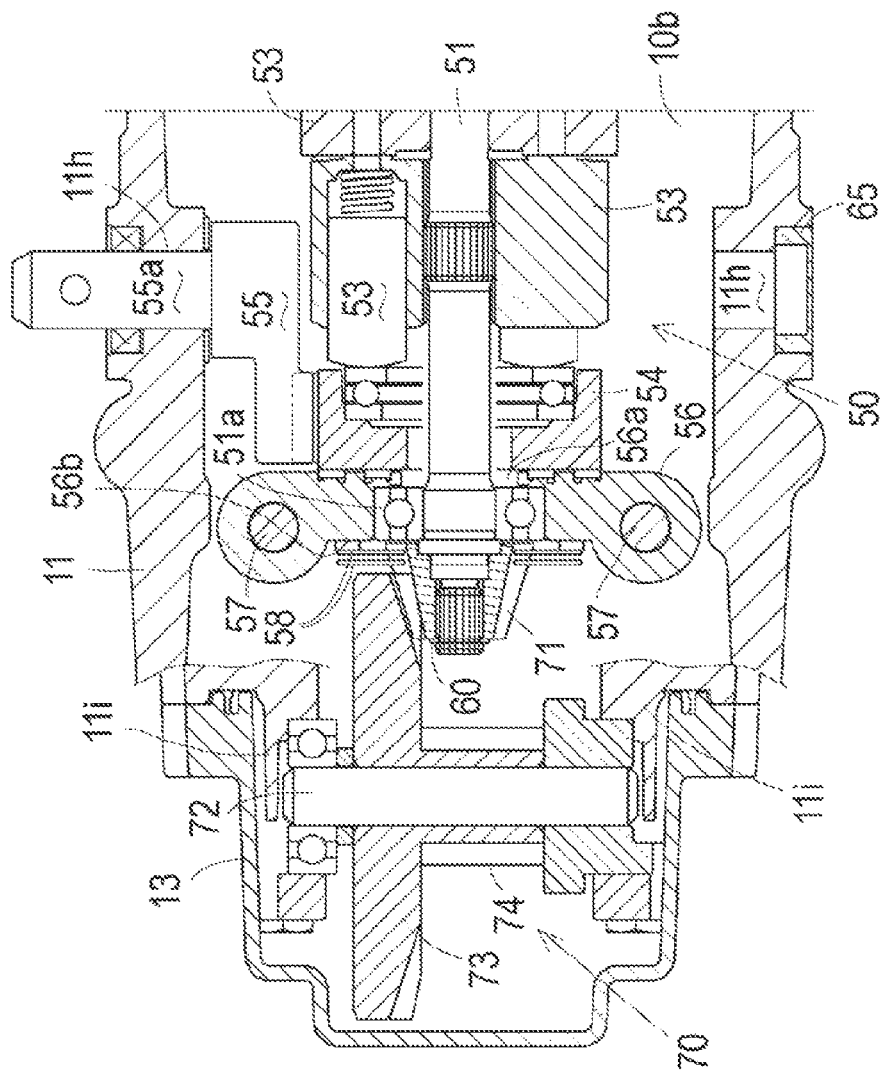
FIG. 4 is a cross sectional view taken along IV-IV arrows of FIG. 1.

Referring to FIGS. 1 and 4, by joining main housing 11 and bottom housing 12 to each other at horizontal joint plane P, a cavity of transaxle casing 10 is formed, and right and left bottom edges of upper rib 11a having semicircular recess 11b therebetween abut against respective right and left top edges of lower rib 12a having semicircular recess 12b therebetween, so that upper and lower ribs 11a and 12a joined to each other serve as a partition wall 10c that divides the cavity of transaxle casing 10 into a front HST chamber 10a and a rear gear chamber 10b. Semicircular recesses 11b and 12b of upper and lower ribs 11a and 12a are joined to each other so as to form a circular opening 10d through which a hydraulic motor 50 of HST 20 is passed as mentioned later.

In this way, the front portion of transaxle casing 10 defines HST chamber 10a accommodating HST 20, and the rear portion of transaxle casing 10 defines gear chamber 10b accommodating speed reduction gear train 70 and axle 2. Partition wall 10c separates HST chamber 10a and gear chamber 10b from each other except that hydraulic motor 50 is passed through opening 10d in partition wall 10c.

The rear portion of main housing 11 defining gear chamber 10b has a top opening 11g at a top thereof, and top housing 13 is fastened by bolts 17 to an edge portion of main housing 11 surrounding top opening 11g so as to cover an upper portion of reduction gear train 70 in gear chamber 10b.

Figure 2:
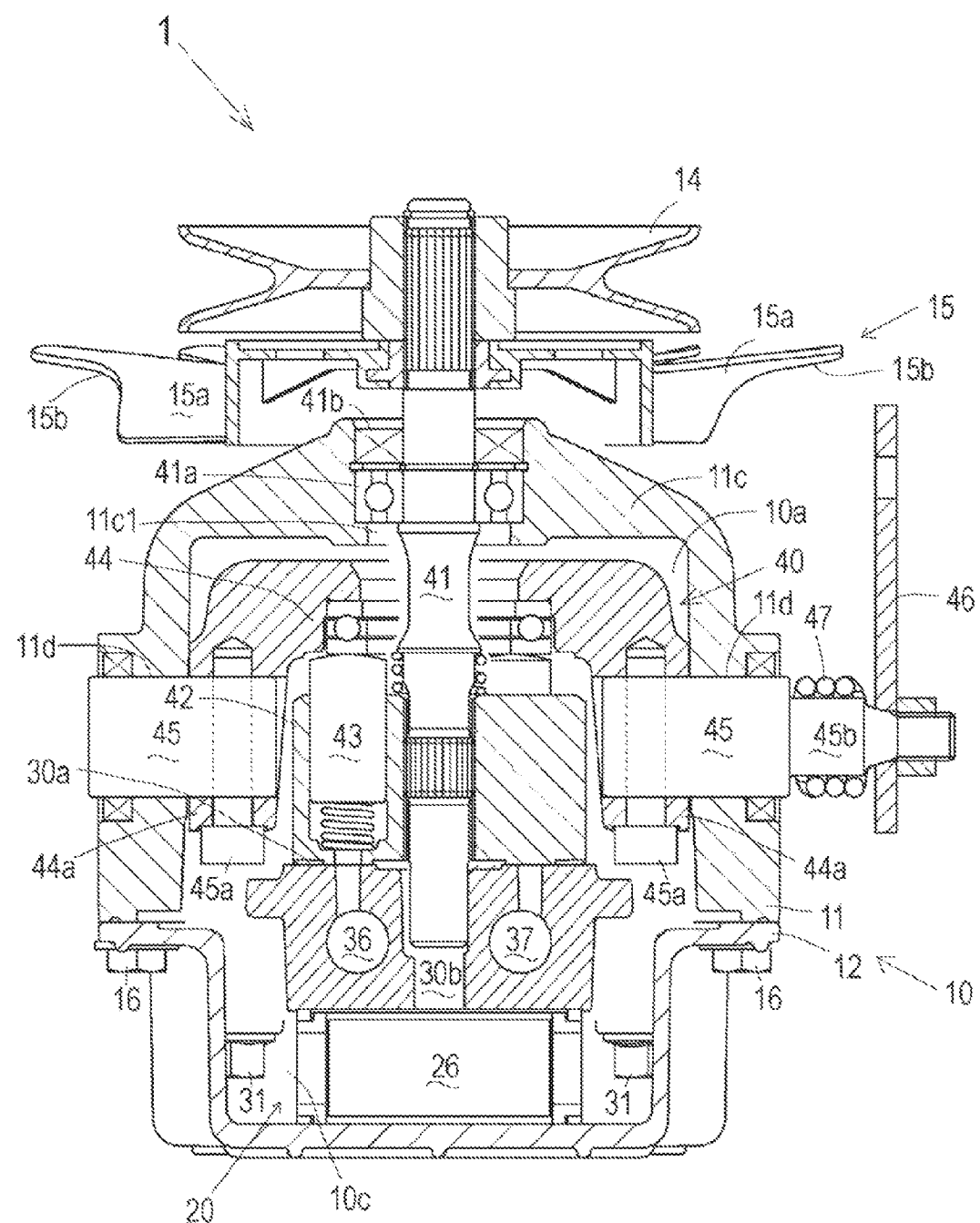
FIG. 2 is a cross sectional view taken along II-II arrows of FIG. 1
Figure 3:
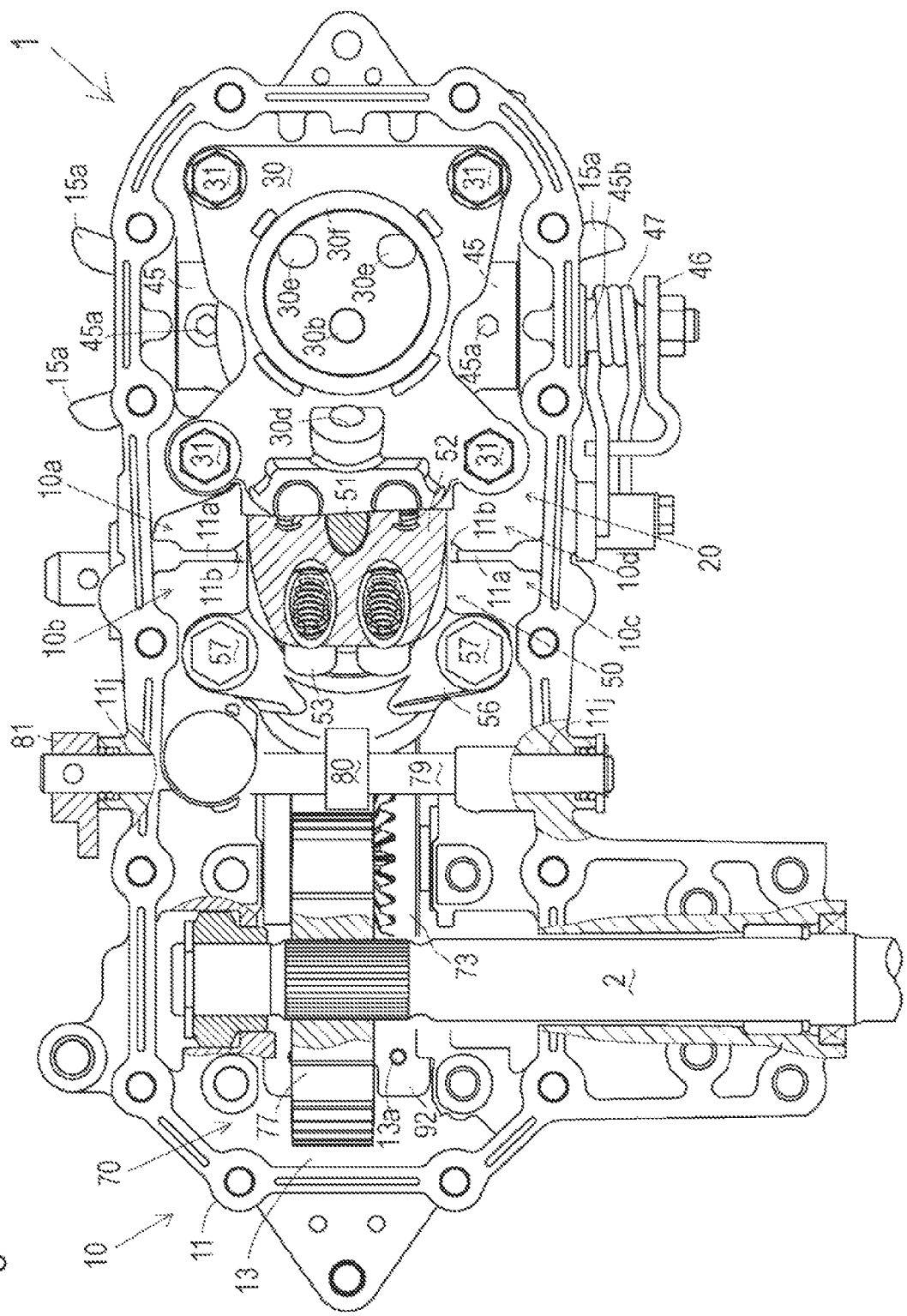
FIG. 3 is a cross sectional view taken along III-III arrows of FIG. 1.

HST 20 includes a center section 30, a hydraulic pump 40, a hydraulic motor 50, and a fluid filter 26. Center section 30 is fastened to main housing 11 by upwardly screwed bolts 31 as shown in FIGS. 1 to 3. Vertically cylindrical fluid filter 26 is placed at a bottom edge thereof on a bottom portion of bottom housing 12, and abuts at a top edge thereof against an annular filter fitting surface 30f formed on a bottom surface of center section 30 as shown in FIG. 3. Fluid filter 26 is submerged in a fluid sump in HST chamber 10a so that fluid is filtered by fluid filter 26 when the fluid penetrates fluid filter 26 from the fluid sump in HST chamber 10a to the inside space of fluid filter 26.

As shown in FIG. 2, right and left main fluid passages 36 and 37 serving as the closed fluid circuit of HST 20 are formed in center section 30 so as to extend in the horizontal fore-and-aft direction. Right and left charge check valves (not shown) are provided in a front portion of center section 30. As shown in FIG. 3, right and left inlet ports 30e connected to the respective charge check valves are open at the bottom surface of center section 30 surrounded by filter fitting surface 30f. The fluid inside fluid filter 26 is introduced into either right or left main fluid passage 36 or 37 via inlet port 30e and the corresponding charge check valve, thereby supplementing the closed fluid circuit of HST 20 with hydraulic fluid.

In this regard, another fluid sump is provided in gear chamber 10b so that a bottom portion of reduction gear train 70 (especially, a later-discussed bull gear 77) is submerged in the fluid sump in gear chamber 10b. Rotating gears of reduction gear train 70 agitate or splash fluid of the fluid sump in gear chamber 10b. The fluid agitated or splashed by the gears tends to be contaminated with air, which may spoil the hydraulic activation of HST 20 if the fluid contaminated with air is mixed into the fluid sump in HST chamber 10a and is introduced into the closed fluid circuit of HST 20 via fluid filter 26 and the charge check valve. Therefore, partition wall 10c obstructs a flow of fluid from the fluid sump in gear chamber 10b to the fluid sump in HST chamber 10a so as to hinder fluid contaminated with air caused by reduction gear train 70 in gear chamber 10b from being mixed into the fluid sump in HST chamber 10a. In other words, the fluid in gear chamber 10b is able to enter HST chamber 10a via only opening 10d along hydraulic motor 50 passed through opening 10d as mentioned later, thereby reducing air mixed in the fluid sump in HST chamber 10a.

Referring to FIGS. 1 to 3, hydraulic pump 40 includes a vertical pump shaft 41, a pump cylinder block 42, plungers 43 and a movable swash plate 44. Vertical pump shaft 41 is fittingly passed through a vertical pump shaft hole 30b of center section 30 rotatably relative to center section 30. Pump cylinder block 42 is slidably rotatably fitted onto a horizontal pump mounting surface 30a formed on a top portion of center section 30 and is fixed on pump shaft 41 projecting upward from pump mounting surface 30a of center section 30. Plungers 43 are vertically reciprocally fitted into respective cylinder bores formed in pump cylinder block 42, thereby constituting axial piston type hydraulic pump 40. Movable swash plate 44 abuts against heads of plungers 43 projecting from pump cylinder block 42.

Figure 5:
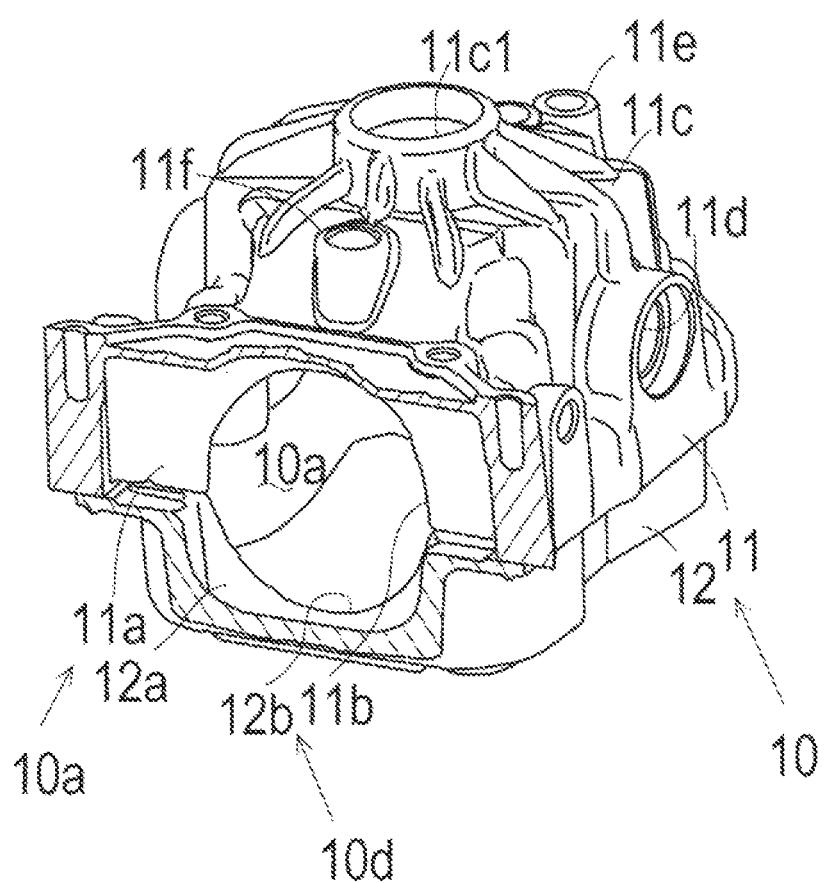

Referring to FIGS. 1, 2 and 5, a front top portion of the ceiling wall of main housing 11 is formed as a pump support portion 11c. Movable swash plate 44 of hydraulic pump 40 is fitted to a ceiling surface of pump support portion 11c slidably rotatably relative to main housing 11. Main housing 11 is formed through right and left side walls of pump support portion 11c with right and left symmetric trunnion holes 11d. Movable swash plate 44 is formed with right and left symmetric feet 44b. Right and left horizontal trunnions 45 are inserted at their proximal portions thereof into respective right and left feet 44a and are fastened to respective feet 44a by respective bolts 45a. Right and left horizontal trunnions 45 are fitted at their distal portions thereof into respective right and left trunnion holes 11d rotatably relative to main housing 11. One trunnion 45 is longer than the other, and a distal end portion 45b of longer trunnion 45 projects outward from main housing 11 and is fixedly provided thereon with a speed control arm 46. A neutral returning spring 47 is wounded around longer trunnion 45 so as to bias movable swash plate 44 and speed control arm 46 toward their neutral position.

Pump support portion 11c is formed with a vertical through hole 11c1. An upper portion of pump shaft 41 projecting upward from pump cylinder block 42 fitted on pump mounting surface 30a of center section 30 is freely passed through movable swash plate 44 fitted to pump support portion 11c and through vertical through hole 11c1 of pump support portion 11c so as to project upward from pump support portion 11c of main housing 11. A bearing 41a and a fluid seal 41b are fitted in through hole 11c1 of pump support portion 11c so as to be interposed between pump shaft 41 and pump support portion 11c of main housing 11.

Figure 7:
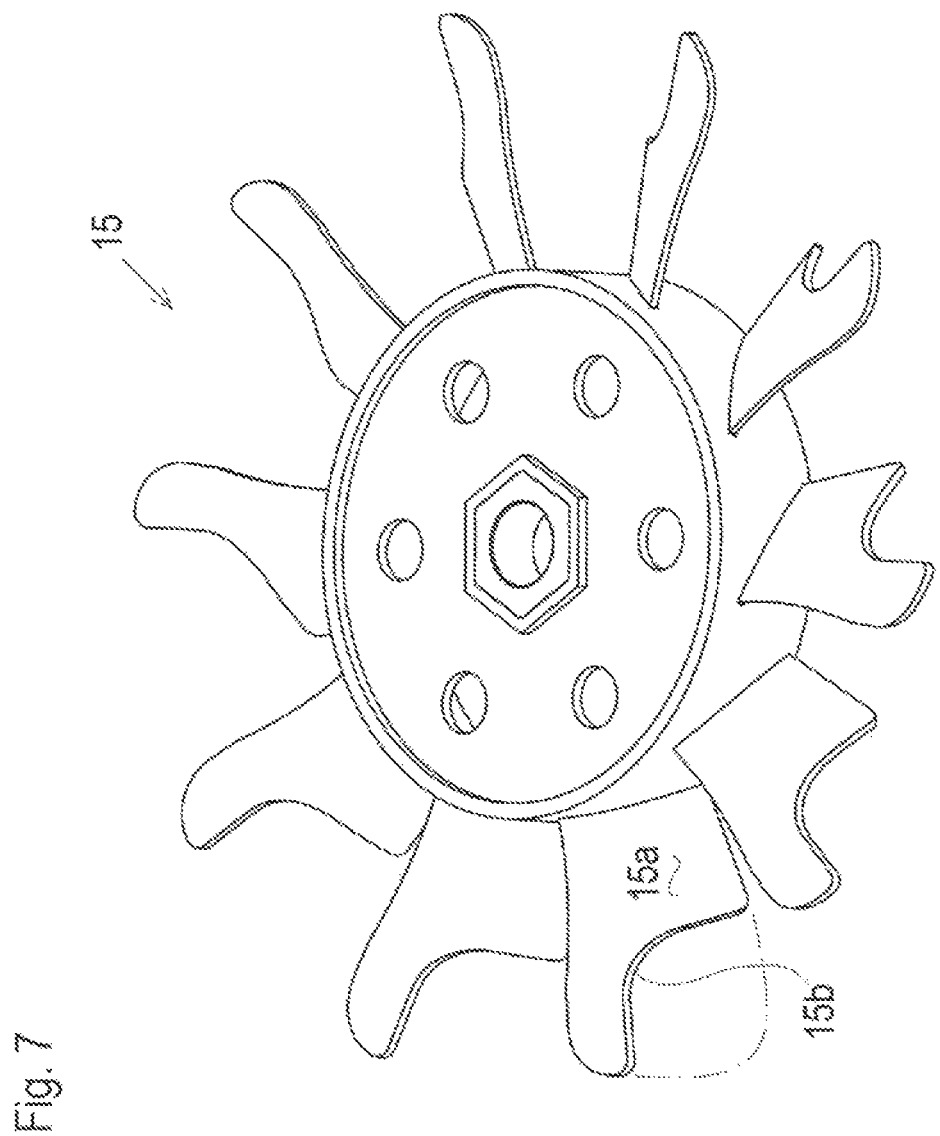
FIG. 7 is a perspective view of a cooling fan 15.

Referring to FIGS. 1 and 2, an input pulley 14 and a cooling fan 15 are fixed on the upper portion of pump shaft 41 projecting upward from pump support portion 11c of transaxle housing 11. An unshown prime mover such as an engine is drivingly connected to input pulley 14 via a belt. Referring to FIGS. 1, 2 and 7, cooling fan 15 is disposed below input pulley 14. Blades 15a of cooling fan 15 are cut off at utmost end portions with curved edges 15b so as to be prevented from interfering with speed control arm 46 or a link member connected to speed control arm 46.

Referring to FIGS. 1 and 5, a boss 11e having a vertical hole is formed at a front portion of pump support portion 11c of main housing 11, and a vertical camshaft 49 is fittingly passed through boss 11e so as to be rotatably centered on its vertical axis. A bypass operation arm 49a is fixed on a top portion of camshaft 49 projecting upward from boss 11f of main housing 11. In HST chamber 10a, a bottom portion of camshaft 48 is formed with a cam for opening the charge check valves. Therefore, when a vehicle having transaxle 1 is towed, bypass operation arm 49a is rotated to rotate camshaft 49 so as to open the charge check valves, thereby releasing fluid from the closed fluid circuit of HST 20, and thereby enabling the towing of the vehicle without resistance of fluid in the closed fluid circuit.

Referring to FIGS. 1, 3 and 4, hydraulic motor 50 is mounted onto a rear portion of center section 30, and is extended rearwardly upward from center section 30. In this regard, center section 30 is formed at a rear portion thereof with a rearwardly downward slant surface serving as a motor mounting surface 30c, and is bored with a motor shaft hole 30d extended forwardly downward from motor mounting surface 30c.

Hydraulic motor 50 includes a motor shaft 51, a motor cylinder block 52, plungers 53 and a movable swash plate 54. Motor shaft 51 is fitted into motor shaft hole 30d of center section 30 rotatably relative to center section 30. Motor cylinder block 52 is slidably rotatably fitted onto motor mounting surface 30c of center section 30, and is fixed on motor shaft 51 extended rearwardly upward from motor mounting surface 30c. Therefore, cylinder bores formed in motor cylinder block 52 are fluidly connected to the cylinder bores in pump cylinder block 42 via main fluid passages 36 and 37 serving as the closed fluid circuit of HST 20. Plungers 53 are fitted into the respective cylinder bores in motor cylinder block 52 reciprocally in the axial direction of motor shaft 51, thereby constituting axial piston type hydraulic motor 50.

Motor shaft 51 and motor cylinder block 52 fixed on motor shaft 51 are extended rearwardly upward from motor mounting surface 30c of center section 30, and are passed through opening 10d in partition wall 10c between HST chamber 10a and gear chamber 10b. Therefore, in gear chamber 10b, an upper portion of motor shaft 51 projects rearwardly upward from motor cylinder block 52 so as to be drivingly connected to reduction gear train 70, as detailed later. An inner peripheral edge of partition wall 10c defining opening 10d approaches an outer peripheral surface of motor cylinder block 52 passing through opening 10d as much as possible so as to further surely partition HST chamber 10a from gear chamber 10b, thereby further restricting the flow of fluid between HST chamber 10a and gear chamber 10b via only opening 10d.

The advantage of hydraulic motor 50 having the slant axis with regard to the vertical axis of hydraulic pump 40 is to horizontally and vertically minimize a portion of transaxle 1 incorporating hydraulic motor 50 while ensuring the sufficient length of motor shaft 51 and the sufficient capacity of motor cylinder block 52. Therefore, the dimension of transaxle 1 in the fore-and-aft direction between pump shaft 41 serving as the input shaft of transaxle 1 and axle 2 serving as the output shaft of transaxle 1 is shortened to facilitate the mounting of transaxle 1 on a small vehicle. In this embodiment, the fore-and-aft middle portion of transaxle casing 10 incorporating hydraulic motor 50 between the front portion of transaxle casing 10 incorporating hydraulic pump 40 and the rear portion of transaxle casing 10 incorporating reduction gear train 70 is shortened in the fore-and-aft direction so as to reduce the entire fore-and-aft length of transaxle 1, and is lowered at the top portion thereof so as to reduce the height of the fore-and-aft middle portion of transaxle 1.

Referring to FIGS. 1, 3 and 4, a motor support member 56 is disposed in a front portion of gear chamber 10b, and is fastened to main housing 11 by bolts 57. Movable swash plate 54 is rotatably and slidably fitted to motor support member 56 and abuts against heads of plungers 53 projecting from motor cylinder block 52. A rear portion of main housing 11 rearward from pump support portion 11c has a top opening 11g defining gear chamber 10b therebelow. Further, main housing 11 is formed through right and left side walls thereof with right and left symmetric trunnion holes 11h below top opening 11g. Movable swash plate 54 is fixed at either a right or left end thereof to a trunnion arm 55. A trunnion shaft 55a projects horizontally from trunnion arm 55 and is fitted into one of right and left trunnion holes 11h rotatably relative to main housing 11. In this regard, either the right or left side of movable swash plate 54 can be optionally selected to have trunnion arm 55 attached thereto, and either right or left trunnion hole 11h can be selected in correspondence to the selected position of trunnion arm 55. Remaining trunnion hole 11h is plugged by a cap 65 as shown in FIG. 4.

An operation lever may be fixed on a distal end portion of trunnion shaft 55a projecting outward from transaxle casing 10. This operation lever for controlling movable swash plate 54 of hydraulic motor 50 can be used to adjust an output scale of transaxle 1 in correspondence to a buyer's demand, or to minutely adjust the output performance of axle 2 of one of right and left transaxles 1 so as to match with that of axle 2 of the other of right and left transaxles 1.

Motor support member 56 is formed with a rearwardly upward slant through hole 56a. The upper portion of motor shaft 51 projecting rearwardly upward from motor cylinder block 52 fitted on motor mounting surface 30c of center section 30 is freely passed through movable swash plate 54 fitted to motor support member 56, and is passed through hole 56a of motor support member 56 so as to project rearwardly upward from motor support member 56. A bearing 51a is fitted in through hole 56a of motor support member 56 to journal motor shaft 51.

Motor support member 56 is formed with a rearwardly downward slant flat surface 56b, and a tip portion of motor shaft 51 projects rearwardly upward from flat surface 56b of motor support member 56. A bevel pinion 71 is fixed on the tip portion of motor shaft 51. More specifically, bevel pinion 71 is spline-fitted on the tip portion of motor shaft 51, and a circular clip 60 is engaged on the tip portion of motor shaft 51 so as to hinder bevel pinion 71 from sliding rearwardly upward along motor shaft 51. Brake discs 58 are disposed parallel to flat surface 56b of motor support member 56, and are engaged onto a bottom portion of bevel pinion 71 close to flat surface 56b so as to be unrotatable relative to bevel pinion 71 and so as to be slidable on bevel pinion 71 in the axial direction of motor shaft 51. A retainer 59 is fixed on motor support member 56 so as to restrict the slidable range of brake discs 58 while allowing brake discs 58 to rotate together with bevel pinion 71. Retainer 59 prevents brake discs 58 from moving to disengage from bevel pinion 71, and circular clip 60 prevents bevel pinion 71 from moving to disengage from brake discs 58.

Referring to FIG. 3, right and left symmetric shaft holes 11j are formed through right and left side walls of main housing 11, and a laterally horizontal locking shaft 79 is supported at right and left end portions thereof through right and left shaft holes 11j rotatably relative to main housing 11. Either the right or left end of locking shaft 79 projecting outward from main housing 11 is selected to have a parking brake arm 78 fixed thereon.

In gear chamber 10b, a locker arm 80 is fixed on locking shaft 79. A tip portion of locker arm 80 is formed with a pawl 80a to be pressed against brake discs 58. Locker arm 80 is formed with detent surfaces 80b and 80c having different angles. When parking brake arm 78 is located at an unbraking position, detent surface 80b contacts motor support member 56 so as to locate pawl 80a separate from brake discs 58 as shown in FIG. 3, thereby allowing rotation of bevel pinion 71 with brake discs 58. When parking brake arm 78 is located at a braking position, detent surface 80c contacts motor support member 56 so as to locate pawl 80a pressed against brake discs 58, thereby braking bevel pinion 71 together with brake discs 58.

As shown in FIGS. 1, 3 and 5, a laterally horizontal gear shaft 72 is disposed in gear chamber 10b adjacent to the fore-and-aft middle portion of top opening 11g and is journalled at right and left ends thereof by right and left brackets 11i formed on main housing 11. A bevel gear 73 formed with a spur pinion 74 is fixed on gear shaft 72. Bevel gear 73 meshes with bevel pinion 71 fixed on the tip portion of motor shaft 51. An axial boss of bevel gear 73 extended along gear shaft 72 serves as spur pinion 74. A spur bull gear 77 is fixed on axle 2 supported by transaxle housing 11 and meshes with spur pinion 74. Therefore, bevel pinions 71, bevel gear 73, spur pinion 74 and spur bull gear 77 constitute reduction gear train 70 for transmitting power from motor shaft 51 of HST 20 to axle 2.

In gear chamber 10b, when viewed in side, a triangular space is provided between rearwardly upward extended hydraulic motor 50 and bull gear 77, and is used to locate locking shaft 79 and locker arm 80. Further, in this triangular space below locking shaft 79 and locker arm 80, bottom housing 12 is formed with upright ribs 12c and 12d extended upward from a bottom portion of bottom housing 12 and laterally to join at right and left ends thereof to right and left side walls of bottom housing 12. Ribs 12c and 12d serve as dams for the fluid sump in gear chamber 10b so as to hinder fluid contaminated with air caused by agitation or splashing of fluid with the gears of reduction gear train 70 from flowing to hydraulic motor 50.

Figure 6:
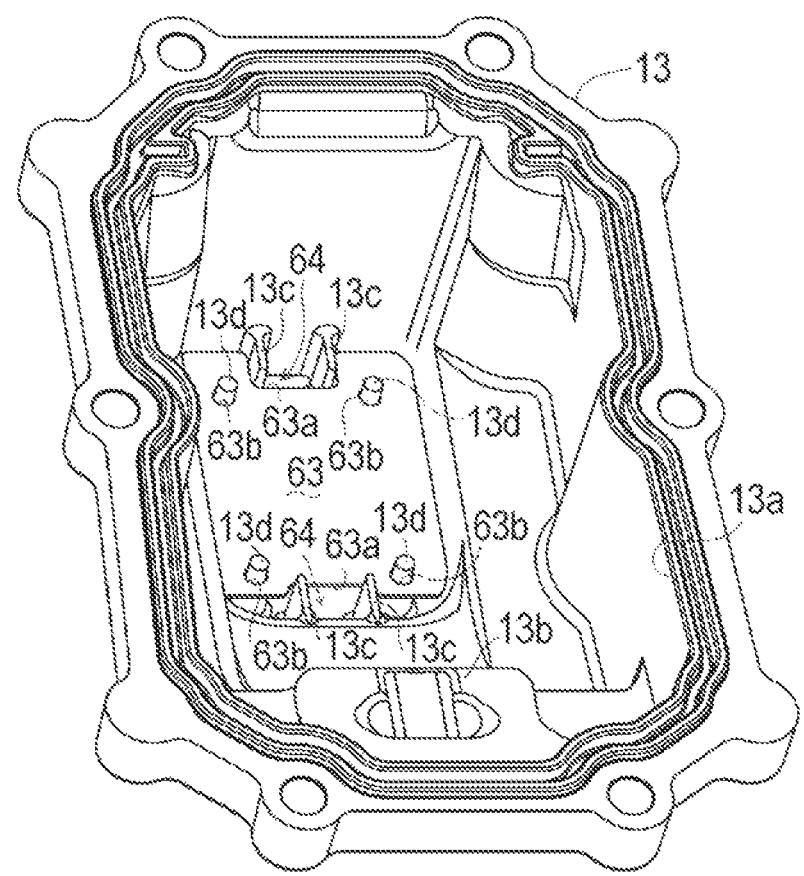
FIG. 6 is a perspective view of a top housing 13 reversed upside down.

Referring to FIGS. 1, 3, 4 and 6, top housing 13 is joined to the rear portion of main housing 11 so as to match its bottom opening 13a with top opening 11g of main housing 11 and so as to cover the upper portion of reduction gear train 70, thereby defining an upper portion of gear chamber 10b. As shown in FIG. 1, a breathing pipe 61 is extended in the fore-and-aft horizontal direction, and is interposed between an upper portion of the front portion of main housing 11 defining HST chamber 10a and a front portion of top housing 13 defining gear chamber 10b. A front end portion of breathing pipe 61 is bent to extend vertically downward, and is fitted into a vertical hole of a boss 11f formed at a rear portion of pump support portion 11c of main housing 11 as shown in FIGS. 1 and 5, so that a downwardly open front end of breathing pipe 61 is open to the upper portion of HST chamber 10a. A rear end portion of breathing pipe 61 is fitted into a fore-and-aft horizontal hole of a boss 13b formed at a front portion of top housing 13 as shown in FIGS. 1 and 6, so that a rearwardly open rear end of breathing pipe 61 is open to the upper portion of gear chamber 10b. Therefore, air heated by activating HST 20 is breathed from HST chamber 10a to gear chamber 10b via breathing pipe 61. Such a high-positioned breathing pipe 61 is safe from fluid splashed by the gears of reduction gear train 70.

Referring to FIGS. 1 and 6, a rear top portion of top housing 13 is provided with a breather 62. Referring to FIGS. 1, 3 and 6, in the upper portion of gear chamber 10b in top housing 13, a horizontal partition plate 63 is settled just below breather 62 so as to prevent fluid splashed up by the gears of reduction gear train 70 from entering breather 62. A metal plate serves as partition plate 63, for example. As shown in FIG. 6, partition plate 63 is formed with notches 63a at front and rear edges, and ribs 13c formed on top housing 13 to define air passages 64 between gear chamber 10b and breather 62 are fittingly passed through front and rear notches 63a of partition plate 63.

Partition plate 63 is formed with pin holes 92b (in this embodiment, four pin holes 63b). Top housing 13 is made of plastic material, and is formed with pins 13d corresponding to respective pin holes 63b. After pins 13d are passed through respective pin holes 63b, tips of pins 13d are squashed by heating so as to prevent partition plate 63 from falling from pins 13d, thereby fixing partition plate 63 to top housing 13.

What is claimed is:
1. A transaxle comprising:
a hydrostatic transmission (hereinafter, "HST") including a hydraulic pump, a hydraulic motor, and a center section, wherein the hydraulic pump and the hydraulic motor are mounted on the center section so as to be fluidly connected to each other via a closed fluid circuit formed in the center section;
an axle;
a gear train interposed between the HST and the axle so as to transmit power from the HST to the axle;
a casing defining an HST chamber and a gear chamber, wherein the HST is disposed in the HST chamber, wherein the gear train and the axle are disposed in the gear chamber;
a partition disposed in the casing so as to separate the HST chamber and the gear chamber from each other, wherein the partition has an opening through which a power transmission means for transmitting power from the HST to the gear train passes to extend from the HST chamber into the gear chamber so as to be drivingly connected to the gear train;
a fluid sump provided in the HST chamber so that the HST is submerged in the fluid sump in the HST chamber; and another fluid sump provided in the gear chamber so that the gear train is submerged in the fluid sump in the gear chamber, wherein the partition is configured to obstruct a flow of fluid between the fluid sumps in the HST chamber and the gear chamber.

2. The transaxle according to claim 1, wherein the hydraulic motor is extended from the HST chamber into the gear chamber via the opening of the partition so as to serve as the power transmission means.

3. The transaxle according to claim 2, wherein the hydraulic motor is extended vertically slantwise in side view from the HST chamber to the gear chamber, and wherein the partition is extended vertically.

4. The transaxle according to claim 1, wherein the casing includes divisional housings formed on the insides thereof with respective ribs serving as the partition, wherein edges of the respective ribs of the divisional housings facing each other are formed with respective recesses, and wherein the divisional housings are joined to each other to constitute the casing so that the ribs of the respective divisional housings abut at the edges thereof against each other, and so that the recesses are joined to each other to serve as the opening.

* * * * *